(No Model.)

5 Sheets—Sheet 1.

G. S. STRONG.
FEED WATER HEATER.

No. 262,147. Patented Aug. 1, 1882.

Witnesses:
David S. Williams
Harry Drury

Inventor:
George S. Strong
by his Attorneys
Howson and Sons (No Model.) 5 Sheets—Sheet 2.

G. S. STRONG.
FEED WATER HEATER.

No. 262,147. Patented Aug. 1, 1882.

Witnesses
James J. Tobins
Harry Drury

Inventor
George S Strong
by his Attorneys
Howson and Sons (No Model.)

5 Sheets—Sheet 3.

G. S. STRONG.
FEED WATER HEATER.

No. 262,147. Patented Aug. 1, 1882.

Witnesses:
David S. Williams
Harry Drury

Inventor:
George S. Strong
by his Attorneys
Howson and Son (No Model.)
5 Sheets—Sheet 4.
G. S. STRONG.
FEED WATER HEATER.
No. 262,147.        Patented Aug. 1, 1882.
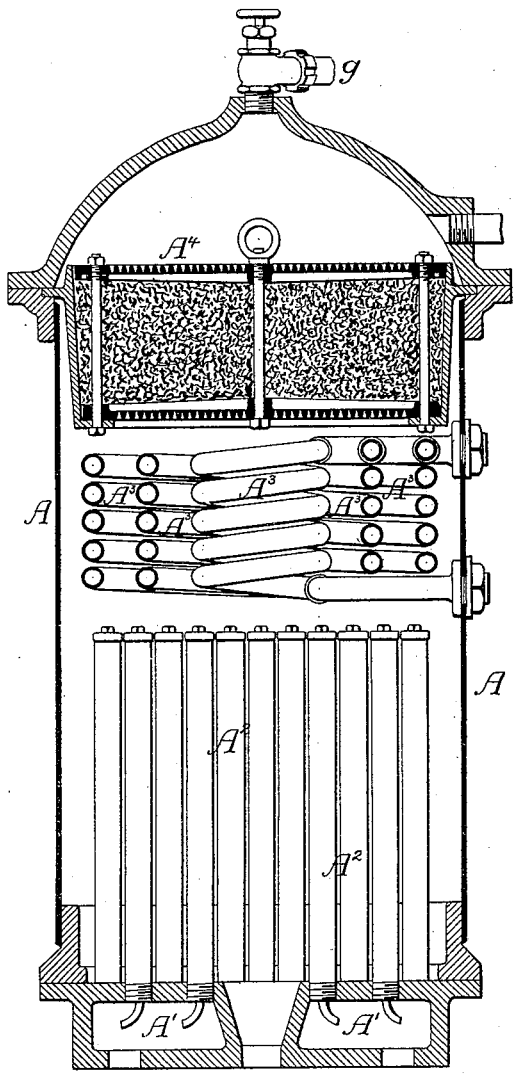
Witnesses:
James T. Tobin
Harry Drury
Inventor:
George S. Strong
by his attorneys
Howson and Son (No Model.) 5 Sheets—Sheet 5.
G. S. STRONG.
FEED WATER HEATER.
No. 262,147. Patented Aug. 1, 1882.
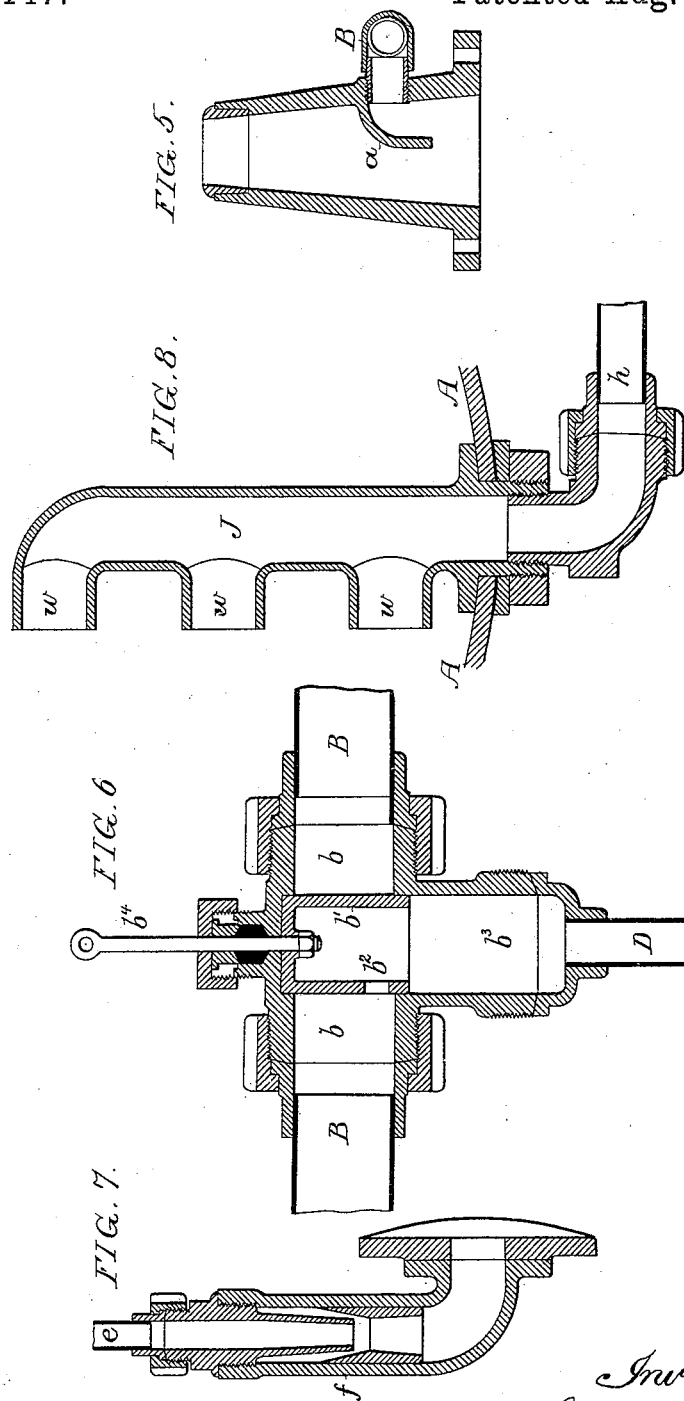
Witnesses
James F. Jobin
Harry Drury
Inventor.
George S. Strong
by his Attorneys
Howson and Sons

UNITED STATES PATENT OFFICE.

GEORGE S. STRONG, OF PHILADELPHIA, PENNSYLVANIA.

FEED-WATER HEATER.

SPECIFICATION forming part of Letters Patent No. 262,147, dated August 1, 1882.

Application filed June 24, 1882. (No model.)

*To all whom it may concern:*

Be it known that I, GEORGE S. STRONG, a citizen of the United States, residing in Philadelphia, Pennsylvania, have invented certain Improvements in Feed-Water Heaters for Locomotives, of which the following is a specification.

The object of my present invention is to use, in connection with a locomotive and without incumbering the latter, a feed-water heater similar in general principle and construction to that for which I have obtained Letters Patent Nos. 226,939 and 227,072.

Figure 1:
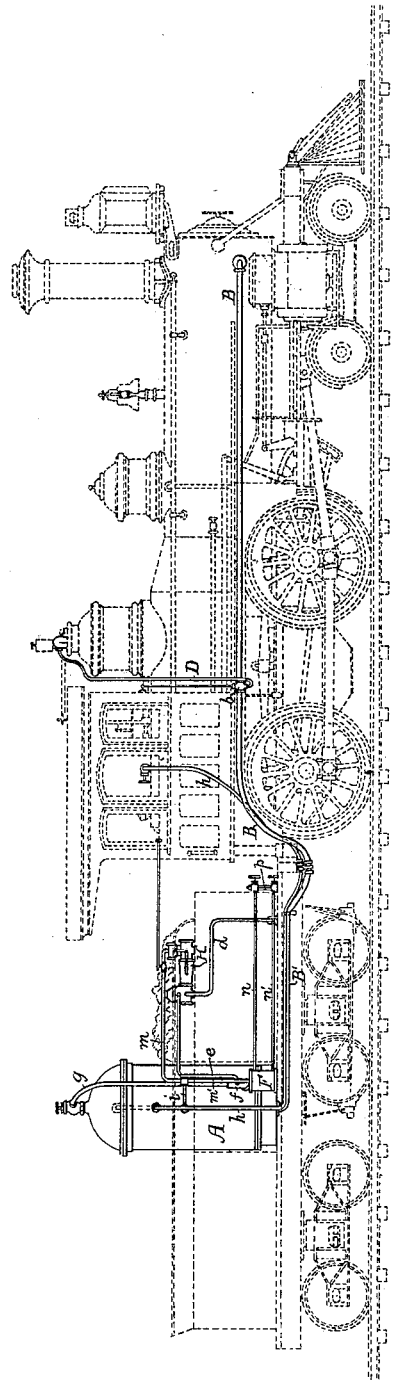
Figure 2:
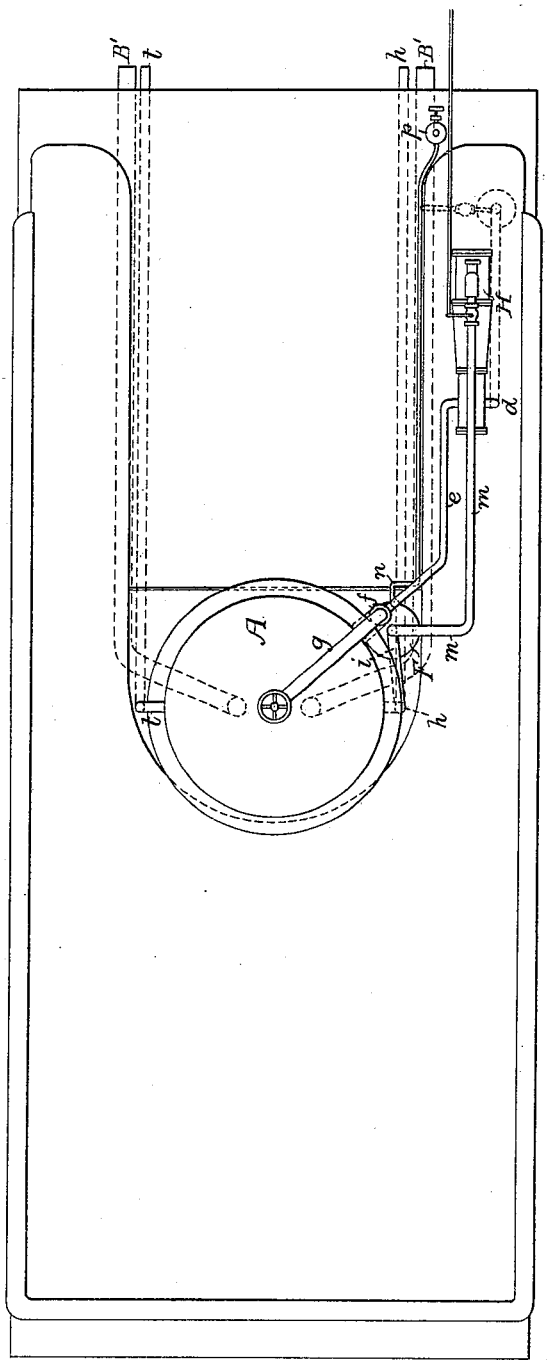
Figure 3:
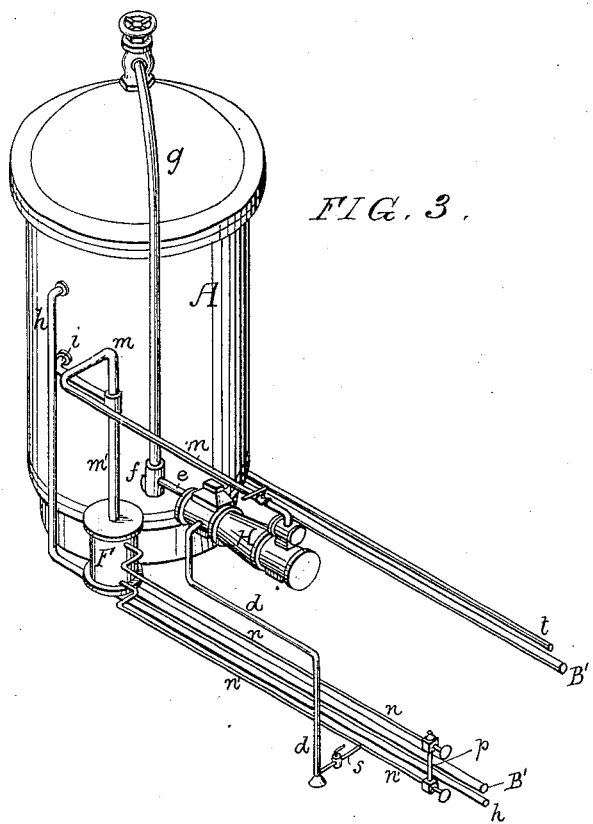

In the accompanying drawings, Figure 1, Sheet 1, is a side view of a locomotive and tender with my improved feed-water heater and connections, those parts only which relate to my invention being shown in full lines, and the remainder being in dotted lines. Fig. 2, Sheet 2, is a plan view of the tender on a larger scale than Fig. 1. Fig. 3, Sheet 3, is a perspective view of the heater and pipes connected therewith; and Fig. 4, Sheet 4, and Figs. 5, 6, 7, and 8, Sheet 5, detached views of parts of the apparatus.

The heater consists, as usual, of an upright cylindrical vessel, A, with dome-top, and is located in the rear end of the fuel-space of the tender, which, being semicircular, is adapted for the reception of the heater without unduly limiting the space available for fuel, the latter comprising in the present instance the space in front of the transverse partition shown in Fig. 2. The heater has at the bottom a steam-chamber, A', which communicates with the vertical heating-pipes $A^2$, and above the latter are the live-steam coils $A^3$ and filter $A^4$, as in my former heater. (See Fig. 4.)

The exhaust-nozzles of the locomotive have curved internal partitions, $a$, Fig. 5, which serve to trap a portion of the escaping steam and direct the same to pipes B on the opposite sides of the locomotive, these pipes being connected by suitable flexible couplings to pipes B' on the tender, and the latter communicating with the steam-chamber A' of the heater, so that when the locomotive is in motion a constant supply of exhaust-steam is introduced into the heater.

A blow-off pipe, D, from the safety-valve communicates with one of the pipes B through a valve-chest, $b$, having a cylindrical valve, $b'$, with a port, $b^2$. (See Fig. 6.) Under ordinary circumstances the valve $b'$ occupies a position in an extension, $b^3$, of the valve-chest, and does not interfere with the free passage of steam through the pipe B; but when there is a discharge from the safety-valve the valve $b'$, owing to the excess of pressure from below, rises and permits the volume of steam from the blow-off pipe to pass backward into the pipe B, through the port $b^2$, the valve falling as soon as the flow of steam through the blow-off pipe ceases. During the time that the valve $b'$ is raised the flow of steam from the exhaust-nozzle through the pipe B is cut off, and the valve is preferably furnished with a rod, $b^4$, under control of the engineer, whereby this result can be effected, when desired, independently of the action of the safety-valve blow-off. While this form of valve is preferred, it is not absolutely essential, as a check-valve located in the pipe B, between the blow-off pipe D and the exhaust-nozzle, might be used in place of the same in some cases.

The tender carries a pump, H, of which $d$ is the suction-pipe and $e$ the discharge-pipe, the latter terminating in a nozzle within a chest, $f$, Fig. 7, which communicates with the interior of the heater and with a circulating-pipe, $g$, as in the former patents. Live steam is conveyed to the heater through a pipe, $h$, and after circulating through the coils $A^3$ escapes through a pipe, $i$, having two branches, $m$ $m'$, the former conveying steam to the valve-chest of the feed-pump, and the branch $m'$ terminating in a receptacle, F, in which is deposited the water of condensation. The receptacle F has two pipes, $n$ $n'$, extending to a gage, $p$, at the front end of the tender, and the lower pipe, $n'$, communicates through a pipe, $s$, with the suction-pipe $d$ of the pump, which thus serves to draw the water of condensation from the receptacle. The pipe $s$ has a valve whereby the flow of water through the same is regulated, the adjustment of the valve being determined by the rapidity with which water accumulates in the receptacle F, as indicated by the gage $p$. The branch $m'$ may communicate directly with the pipe $d$ in some cases; but the use of the receptacle F and pipes $n$ $n'$ is preferred, as providing means for more accurately governing the action of the apparatus.

The feed-water is conveyed from the heater to the boiler through a jointed pipe, $t$, as shown in Fig. 2.

There are in the heater in the present instance three live-steam coils, $A^3$, each independent of the others, and each connected at the upper end to a branch, $w$, on the inlet-chest J and at the lower end to a similar branch on the outlet-chest J', so that a more rapid flow of steam is insured and more thorough heating effected than when the coils are made of a single continuous pipe, there being also less condensation—an important point when it is considered that the steam, after its escape, has other duties to perform.

I am aware that it is not new to pass exhaust-steam through the water in the tank of a locomotive-tender for the purpose of heating the same prior to pumping it into the boiler; but this plan is essentially different from the main feature of my invention, for when the feed-water is thus heated to a comparatively high temperature it is difficult to pump the same or convey it to the boiler by an injector, whereas the pump in my case acts upon the water before it is heated, and the feed-water being always maintained in the heater at boiler-pressure, it will flow readily from the heater into the boiler when communication between the two is established.

The two exhaust-pipes B' B' may converge before reaching the heater, a single pipe only entering the latter; or in some cases a single exhaust-pipe only may be used. The latter arrangement, however, interferes with the regular beat or pulsation of the blast from the stack, and is therefore objectionable.

As the heater is combined with a filter, a large casing for the structure becomes necessary, and by locating the structure in the fuel-space of the tender I not only overcome the objections to placing the same upon the locomotive, but I am also enabled to remove the pump or injector from the locomotive, and to bring said pump or injector, as well as the heater, as close as possible to the supply of water.

I claim as my invention—

1. The combination of the casing A, located on the tender of the locomotive, and having internal heating-tubes and a filter, a pipe or pipes for conveying steam from the locomotive to said tubes, a feed-pump, also on the tender, for the maintaining the feed-water under pressure in the casing A, and a discharge-pipe leading from the casing to the boiler of the locomotive, as set forth.

2. The combination of the heater A, the exhaust-steam pipe B, and the safety-valve blow-off pipe D, communicating with said pipe B, as set forth.

3. The combination of the heater A, the exhaust-steam pipe B, the blow-off pipe D, and the chest $b$, having a sliding valve, $b'$, with port $b^2$, as set forth.

4. The combination of the heater A, the exhaust-steam pipe B, the blow-off pipe D, and the chest $b$, having a sliding valve, $b'$, with port $b^2$ and rod $b^4$, as specified.

5. The combination of the heater and feed-pump with the live-steam coil having a discharge-branch communicating with the steam-chest of the pump, as described.

6. The combination of the heater and feed-pump with the live-steam coil having two branches, $m$ $m'$, the former communicating with the steam-chest of the pump, and the branch $m'$ serving as a drain-pipe for the water of condensation.

7. The combination of the heater, the feed-pump, and the live-steam coil having a draining-branch, $m'$, communicating with the suction-pipe of the feed-pump, as set forth.

8. The combination of the heater, the feed-pump, the live-steam coil having a draining-branch, $m'$, the receptacle F, the pipes $n$ $n'$, the gage $p$, and the valved pipe $s$, leading from the pipe $n'$ to the suction-pipe of the pump, as specified.

9. The combination of the heater with two or more steam-coils, and with inlet and outlet chests having as many branches as there are coils, as specified.

In testimony whereof I have signed my name to this specification in the presence of two subscribing witnesses.

GEORGE SIMPSON STRONG.

Witnesses:
HARRY DRURY,
HARRY SMITH.